(12) United States Patent
Chabot

(10) Patent No.: US 9,889,345 B2
(45) Date of Patent: Feb. 13, 2018

(54) DISC RETRIEVER

(71) Applicant: Ryan Chabot, Euless, TX (US)

(72) Inventor: Ryan Chabot, Euless, TX (US)

( * ) Notice: Subject to any disclaimer, the term of this patent is extended or adjusted under 35 U.S.C. 154(b) by 0 days.

(21) Appl. No.: 15/279,244

(22) Filed: Sep. 28, 2016

(65) Prior Publication Data

US 2017/0087421 A1    Mar. 30, 2017

Related U.S. Application Data

(60) Provisional application No. 62/210,570, filed on Sep. 28, 2015.

(51) Int. Cl.
| | |
|---|---|
| *B25J 1/04* | (2006.01) |
| *A63B 67/06* | (2006.01) |
| *A63B 47/02* | (2006.01) |
| *B25J 1/02* | (2006.01) |

(52) U.S. Cl.
CPC .............. *A63B 47/02* (2013.01); *A63B 67/06* (2013.01); *B25J 1/02* (2013.01)

(58) Field of Classification Search
CPC ......... A63B 47/02; A63B 67/06; A47F 13/06; B25J 1/04; B63B 21/54
USPC ................. 294/19.2, 175, 191, 209, 210, 211
See application file for complete search history.

(56) References Cited

U.S. PATENT DOCUMENTS

| | | | | |
|---|---|---|---|---|
| 291,177 | A | * | 1/1884 | Felt ........................ A01K 15/003 119/801 |
| 1,208,624 | A | * | 12/1916 | Newman .............. A01K 15/003 119/801 |
| 1,715,039 | A | | 1/1926 | Locke et al. |
| 5,566,538 | A | * | 10/1996 | Frazier ...................... A01G 3/00 294/175 |
| 6,293,601 | B1 | * | 9/2001 | Johnson ................. A01K 97/14 294/175 |
| 6,454,331 | B1 | * | 9/2002 | Ahlenius ................ A63B 47/02 294/19.2 |
| 6,499,778 | B2 | * | 12/2002 | Boulay .................. H02G 1/085 254/134.3 R |
| 6,652,013 | B1 | * | 11/2003 | Peterson .................. B25G 1/04 294/210 |
| 6,705,654 | B2 | * | 3/2004 | Slauf ........................ B25G 1/04 294/210 |
| 6,726,265 | B2 | | 4/2004 | Miller |
| 7,320,489 | B1 | | 1/2008 | Domb |
| 7,677,620 | B1 | | 3/2010 | Tasey |

(Continued)

OTHER PUBLICATIONS

PCT International Search Report; Application No. PCT/US2016/054221; dated Feb. 27, 2017; 2 pages.

(Continued)

*Primary Examiner* — Dean J Kramer
(74) *Attorney, Agent, or Firm* — Lightfoot & Alford PLLC; Michael J. Schofield

(57) ABSTRACT

A disc retriever includes an extendable, telescoping pole and a rigid hook configured to interface with various types of disc golf discs and secure a disc within the retriever by reaching across and/or under the disc, receiving the disc into an opening of the hook, and retaining the disc golf disc within the opening of the hook by at least one of gravity, pressure, and/or friction while the pole is pulled and/or manipulated by a user to retrieve the disc golf disc from the unreachable area.

20 Claims, 6 Drawing Sheets

(56) References Cited

U.S. PATENT DOCUMENTS

| | | | |
|---|---|---|---|
| 8,328,257 B1* | 12/2012 | La Coste | B63B 21/54 |
| | | | 114/230.25 |
| 2007/0049396 A1 | 3/2007 | Scheibe | |
| 2011/0221219 A1 | 9/2011 | Heaton | |
| 2015/0015011 A1* | 1/2015 | Silva | B25J 1/04 |
| | | | 294/104 |

OTHER PUBLICATIONS

PCT Written Opinion of the International Searching Authority; Application No. PCT/US2016/054221; dated Feb. 27, 2017; 4 pages.

* cited by examiner

DISC RETRIEVER

CROSS-REFERENCE TO RELATED APPLICATIONS

The present application claims priority under 35 U.S.C. 119(e) to U.S. Provisional Patent Application No. 62/210,570 filed on Sep. 28, 2015 by Ryan Jon Chabot, and entitled "T-Rex Disc Retriever," the disclosure of which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Disc golf is played on courses that often contain various terrain features such as, but not limited to cliffs, trees, thick foliage, brush, creeks, rivers, and/or lakes. As such, it is not uncommon for a disc golf player to throw a disc into and/or near such a terrain feature and/or other hazard that renders the disc unreachable by the player alone.

SUMMARY

In some embodiments of the disclosure, a disc retriever is disclosed as comprising: a rigid hook configured to configured to selectively retain a disc within an opening of the rigid hook when a flight plate of the disc is oriented in each of upwards and downwards direction.

In other embodiments of the disclosure, a disc retriever is disclosed as comprising: an extendable pole; and a rigid hook coupled to the extendable pole and configured to selectively retain a disc within an opening of the rigid hook when a flight plate of the disc is oriented in each of upwards and downwards direction.

In yet other embodiments of the disclosure, a method of retrieving a disc is disclosed as comprising: method of retrieving a disc, comprising: providing a disc retriever with an extendable pole and a rigid hook coupled to the extendable pole; extending the extendable pole over a far side of a disc; receiving the disc into an opening of the rigid hook; and retaining the disc within the opening of the rigid hook by at least one of gravity and friction by at least one of raising and pulling the extendable pole.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

In some cases, it may be desirable to provide a disc retriever having a hook on an end of an extendable, telescoping pole. For example, where a disc golf player may throw a disc golf disc into an area (i.e. off an elevated cliff, into a tree, into and/or underneath thick foliage and/or brush, and/or into a water hazard such as a creek, river, or lake) where the disc is unreachable by the player alone, it may be desirable for a disc golf player to use a disc retriever having an extendable, telescoping pole and a rigid hook configured to interface with various types of disc golf discs (i.e. driver, fairway driver, midrange, and/or putt and approach discs) to remove the disc from the unreachable area. Systems and methods are disclosed herein that comprise providing a disc retriever with an extendable, telescoping pole and a rigid hook configured to interface with various types of disc golf discs and secure a disc within the retriever by reaching the hook of the disc retriever under and/or across the disc, receiving the disc into an opening of the hook, and retaining the disc within the opening of the hook by at least one of gravity, pressure, and/or friction while the pole is pulled and/or manipulated by a user to retrieve the disc from the unreachable area.

Figure 1:
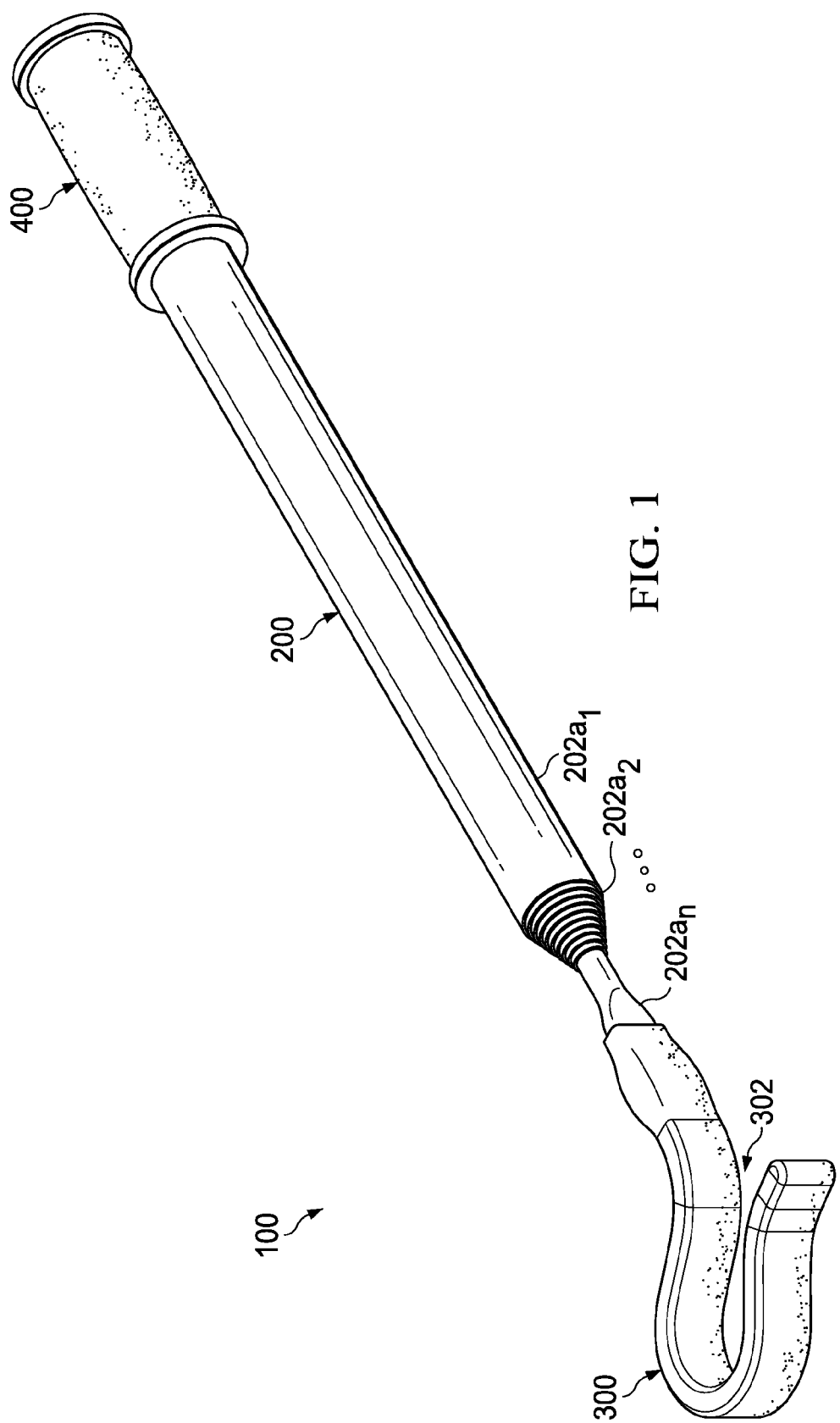
FIG. 1 is an oblique view of a disc retriever according to an embodiment of the disclosure.

Referring now to FIG. 1, an oblique view of a disc retriever 100 is shown according to an embodiment of the disclosure. The disc retriever 100 may generally comprise a pole 200, a hook 300 disposed at one end of the pole 200, and a handle 400 disposed at an opposing end of the pole 200. The disc retriever 100 is configured to be manually extended by a user into an unreachable area (i.e. down an elevated cliff, into a tree, into and/or underneath thick foliage and/or brush, and/or into a water hazard such as a creek, river, or lake) to retrieve a disc which is otherwise unreachable by the player alone. The pole 200 may generally be formed from a non-corrosive material such as aluminum, stainless steel, and/or a plated steel since the pole 200 may foreseeably be used in aquatic environments. The pole 200 comprises an extendable, telescopic pole comprising a plurality of concentric, coaxial pole sections $202a_1$-$202_n$ of increasing diameter from the largest diameter pole section $202a_1$ to the smallest diameter pole section $202_n$. Each adjacent pole section $202a_2$-$202_n$ may be slidably received within the larger diameter adjacent pole section $202a_1$-$202a_{n-1}$, respectively, to form a series of selectively slidable pole sections $202a_2$-$202_n$ that extend along a common axis to extend the overall length of the pole 200.

Each selectively slidable pole section $202a_2$-$202_n$ may be selectively extended partially to a plurality of positions with respect to a maximum extendable length, such that the pole 200 is adjustable to a plurality of lengths that range from a fully collapsed length to a fully extended length. Each selectively slidable pole section $202a_2$-$202_n$ may also comprise a stop (not pictured) that prevents a smaller pole section $202a_2$-$202_n$ from being completely removed from an adjacent, larger pole section $202a_1$-$202a_{n-1}$ that houses and/or receives the adjacent smaller pole section $202a_2$-$202_n$, respectively. Furthermore, it will be appreciated that each pole section $202a_2$-$202_n$ may also comprise a tapered end, slip fit, and/or other feature such as a bushing, washer, or other feature that maintains the position of each selectively slidable pole section $202a_2$-$202_n$ in an extended and/or partially extended position via friction even when a slight axial, compressive force is applied to the pole 200, thereby eliminating the need for an additional locking mechanism.

The hook 300 generally comprises a rigid, non-movable hook-shaped profile that is configured to interface with various types of disc golf discs and secure a disc within the hook 300 by receiving the disc into an opening 302 of the hook 300 and retaining the disc within the opening 302 of the hook 300 by at least one of gravity, pressure, and/or friction while the pole 200 is pulled and/or manipulated by a user to retrieve the disc from an unreachable area. The hook 300 comprises a substantially thin strip having a flat profile along a width of the hook 300 that is formed into a specialized shape in order to interface with various disc golf discs. As will be discussed later herein in greater detail, the flat profile along the width of the hook 300 may provide a support surface for a disc when a disc is inserted into the opening 302 of the hook 300. The hook 300 may be formed from aluminum, steel, and/or stainless steel. In this embodiment, the hook 300 comprises a rubberized coating. In other embodiments, the hook 302 may comprise an elastomeric coating and/or any other coating. In some embodiments, the rubberized coating on the hook 300 may provide additional grip between the hook 300 and a disc golf disc by increasing a coefficient of friction between a disc golf disc and the hook 300 as compared to a non-coated rigid hook to further secure, hold, and/or maintain the disc within the opening 302 of the hook 300. However, in other embodiments, the hook 300 may be formed from plastic, an elastomeric material, a rubberized material, and/or a composite material.

Figure 6:
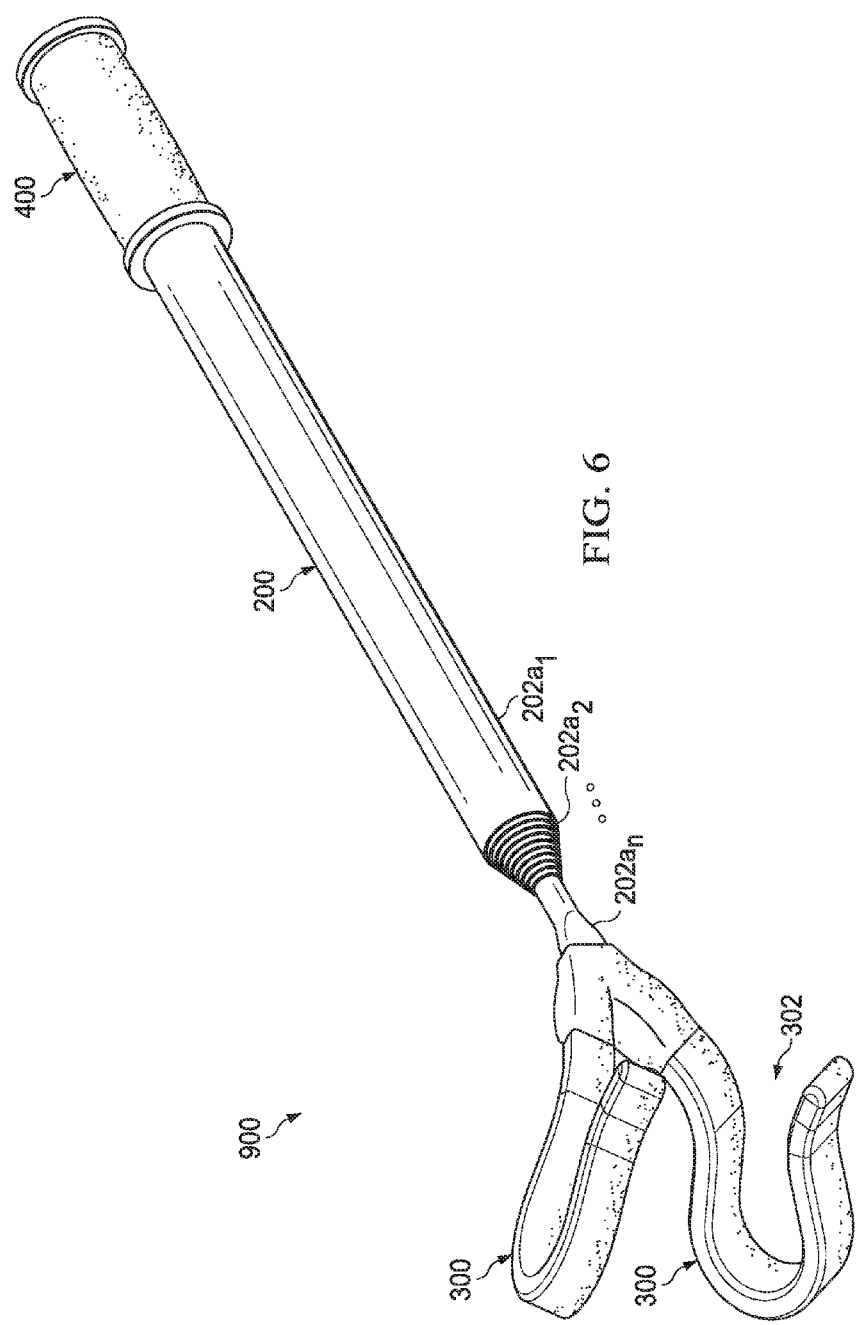
FIG. 6 is an oblique view of a disc retriever according to an alternative embodiment of the disclosure.

The hook 300 may generally be secured to the smallest diameter pole section $202a_n$ of the pole 200. In this embodiment, the hook 300 may be inserted into the smallest diameter pole section $202a_n$ of the pole 200. However, in other embodiments, the smallest diameter pole section $202a_n$ of the pole 200 may be received within a cavity of the hook 300, such that the hook 300 may be slid over the exposed end of the smallest diameter pole section $202a_n$ of the pole 200. As such, in some embodiments, the hook 300 and the smallest diameter pole section $202a_n$ of the pole 200 may comprise an interference fit. Alternatively, the hook 300 and the smallest diameter pole section $202a_n$ of the pole 200 may comprise a clearance fit and be secured with additional means. In some embodiments, the hook 300 may be secured to the smallest diameter pole section $202a_n$ of the pole 200 by adhesive, rivets, screws, Velcro, and/or any other fastening means. Furthermore, in alternative embodiments, the hook 300 may be welded to the smallest diameter pole section $202a_n$ of the pole 200 when the hook 300 and the pole 200 are formed from a substantially similar material, such as aluminum, steel, and/or stainless steel. It will be appreciated that the rubberized coating on the hook 300 may be applied after the hook 300 is attached to the smallest diameter pole section $202a_n$ of the pole 200. Further, it will be appreciated that in alternative embodiments, the disc retriever 100 may not comprise the pole 200 and the handle 400 disclosed herein, and only comprise a selectively attachable hook 300, such that the hook 300 may be selectively attachable to and/or selectively removable from an alternative pole, stick, branch, and/or other elongated member via adhesive, rivets, screws, Velcro, and/or any other fastening means for retrieving a disc golf disc from an unreachable area. Furthermore, while only one hook 300 is disclosed, more than one hook 300 may be used such that in some embodiments, the disc retriever 100 may comprise two hooks 300 arranged in a Y-shaped arrangement as shown by disc retriever 900 in FIG. 6 and/or a plurality of hooks 300 arranged in a parallel-shaped arrangement.

The handle 400 may generally comprise a plastic and/or rubberized, preformed grip that slides over and/or secures to the largest diameter pole section $202a_1$ of the pole 200 and is configured to provide a user a more secure grip on the pole 200. However, in other embodiments, the grip may comprise a rubberized coating that is substantially similar to the rubberized coating on the hook 300. In some embodiments, the handle 400 may comprise a smooth surface. However, in other embodiments, the handle 400 may comprise a textured surface.

The disc retriever 100 may be manufactured in a plurality of lengths. For example, in some embodiments, the disc retriever 100 may comprise a length of about 21.5 inches and extend to a length of about 11.5 feet. In other embodiments, the disc retriever 100 may comprise a length of about 21 inches and extend to a length of about 7 feet. However, it will be appreciated that the disc retriever 100 may comprise a fully collapsed length that is at least about 10%, at least about 12.5%, at least about 15%, at least about 17.5%, and/or at least about 20% of the fully extended length of the disc retriever 100, rendering the disc retriever 100 easily transportable in a disc golf bag and/or carried by a disc golf player. As such, the disc retriever 100 may easily clip into a complementary clip and/or plurality of clips on a disc golf bag or may be held in place on a disc golf bag by magnets when the pole 200 is formed from a magnetic material.

Figure 2:
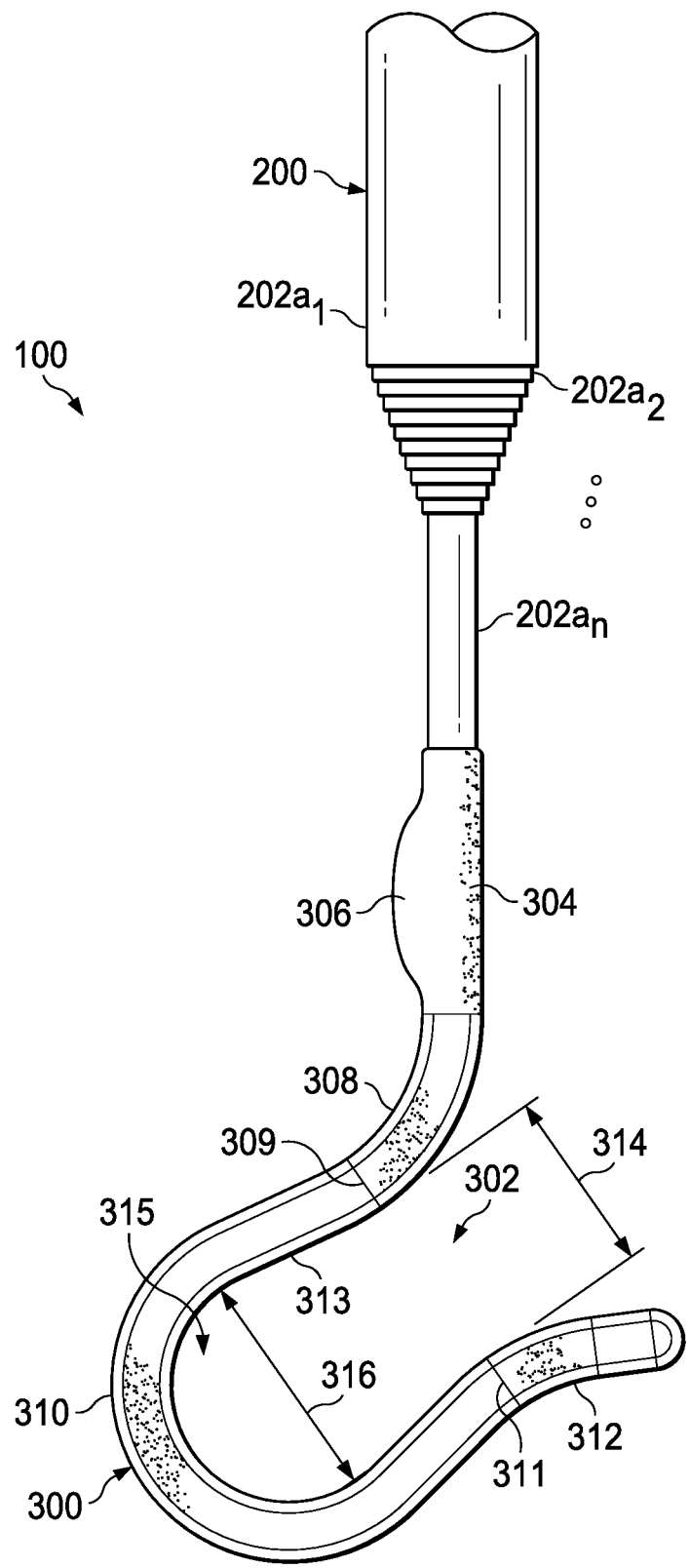
FIG. 2 is a close-up orthogonal side view of a portion of the disc retriever of FIG. 1 according to an embodiment of the disclosure.

Referring now to FIG. 2, a close-up orthogonal side view of a portion of the disc retriever 100 of FIG. 1 is shown according to an embodiment of the disclosure. More specifically, the hook 300 of the disc retriever 100 is shown in greater detail. The hook 300 comprises a mounting portion 304, an attachment portion 306, a first radial bend 308, a second radial bend 310 that begins at interface position 309 at an end of the first radial bend 308 that extends in an opposing radial direction as compared to the first radial bend 308 and extends at least about 180 degrees to form the opening 302 of the hook 300, and an extended tab 312 that begins at an interface 311 at an end of the second radial bend 310 and extends from the second radial bend 310 in at least one of a substantially straight direction and an opposing radial direction as compared to the second radial bend 310.

The mounting portion 304 of the hook 300 comprises a substantially straight length that may be selectively received within and secured to the smallest diameter pole section $202a_n$ of the pole 200. In this embodiment, the hook 300 may be inserted into the smallest diameter pole section $202a_n$ of the pole 200. As such, a distal end of the smallest diameter pole section $202a_n$ of the pole 200 may be formed to comprise a complementary opening to receive at least a portion of the mounting portion 304 of the hook 300. However, in other embodiments, the smallest diameter pole section $202a_n$ of the pole 200 may be received within a cavity of mounting portion 304 of the hook 300, such that the mounting portion 304 of the hook 300 may be slid over the distal end of the smallest diameter pole section $202a_n$ of the pole 200.

In this embodiment, the attachment portion 306 comprises a plurality of rivets disposed through the mounting portion 304 to permanently affix the hook 300 to the smallest diameter pole section $202_n$ of the pole 200. In some embodiments, the attachment portion 306 may comprise at least one of adhesive, screws, Velcro, and/or any other fastening means to permanently affix the hook 300 to the smallest diameter pole section 202$_n$ of the pole 200. In alternative embodiments, the attachment portion 306 of the hook 300 may comprise welds that permanently affix the hook 300 to the smallest diameter pole section 202$_n$ of the pole 200 when the hook 300 and the pole 200 are formed from a substantially similar material, such as aluminum, steel, and/or stainless steel. Further, it will be appreciated that the rubberized coating on the hook 300 may be applied after the hook 300 is attached to the smallest diameter pole section 202$_n$ of the pole 200, such that the rubberized coating extends over the rivets of the attachment portion 306 and the remainder of the hook 300. Accordingly, the rubberized coating may increase an overall dimension of the hook 300.

From the mounting portion 304, the first radial bend 308 extends increasingly axially away from a longitudinal axis of the pole 200 as the first radial bend 308 extends further from the mounting portion 304. In some embodiments, the first radial bend 308 may position the remainder of the hook 300 at an optimal angle for retrieving a disc. The second radial bend 310 begins at the interface position 309 at the end of the first radial bend 308. The second radial bend 310 may be joined tangentially to the first radial bend 308 at the interface 309 and extend in an opposing radial direction as compared to the first radial bend 308. The second radial bend 310 may comprise a gradually decreasing radius from a beginning of the second radial bend 310 at interface 309 to an end of the second radial bend 310 at interface 311. Accordingly, the second radial bend 310 may generally extend at least about 180 degrees between interfaces 309, 311 to generally form a horseshoe shaped bend and form the opening 302 of the hook 300 substantially between interfaces 309, 311. Additionally, the second radial bend 310 may comprise a landing zone 313. As will be discussed later herein in greater detail, the landing zone 313 comprises an inner surface of the second radial bend 310 that interfaces with a disc golf disc to selectively retain the golf disc within the opening 302 of the hook 300. In some embodiments, the landing zone 313 may comprise a substantially large radius. However, in other embodiments, the landing zone 313 may comprise a substantially flat surface.

The extended tab 312 begins at interface 311 at the end of the second radial bend 310. The extended tab 312 may be joined tangentially to the second radial bend 310 and extend from the second radial bend 310 in at least one of a substantially straight direction and an opposing radial direction as compared to the second radial bend 310. The extended tab 312 and the first radial bend 308 may also open radially away from the respective interfaces 309, 311 to form a gradually increasing receiving portion that may aid in selectively guiding a disc golf disc into the opening 302 of the hook 300. The opening 302 may therefore be defined as the open portion between the interfaces 309, 311 and comprise an opening width 314. Further, it will be appreciated that in some embodiments, the second radial bend 310 may form a cavity 315 that may comprise a width 316 greater than the opening width 314. However, in other embodiments, the cavity 315 may comprise a width 316 that is substantially similar to the opening width 314.

The hook 300 comprises a rigid, non-movable hook-shaped profile that is configured to interface with various disc golf discs. The substantially thin, flat profile along the width of the hook 300 is configured to provide a support surface for a disc when a disc is inserted into the opening 302 of the hook 300. In some embodiments, the hook 300 may comprise a width of at least about 0.25 inches after application of the rubberized coating. However, in some embodiments, the hook 300 may comprise a width of at least about 0.5 inches after application of the rubberized coating. Further, in other embodiments, the hook 300 may comprise a width of at least about 0.75 inches, at least about 1.0 inches, and/or at least about 1.25 inches after application of the rubberized coating. The substantially flat, wide width of the hook 300 provides stability to a disc received in the opening of the hook 300. In some instances, this may increase the efficiency and/or effectiveness of disc retrieval, thereby eliminating the need for additional and/or multiple hooks. However, while only one hook 300 is disclosed, this disclosure contemplates that more than one hook 300 may be used such that in some embodiments, the disc retriever 100 may comprise two hooks 300 arranged in a Y-shaped arrangement as shown by disc retriever 900 in FIG. 6 and/or a plurality of hooks arranged in parallel.

Figure 3:
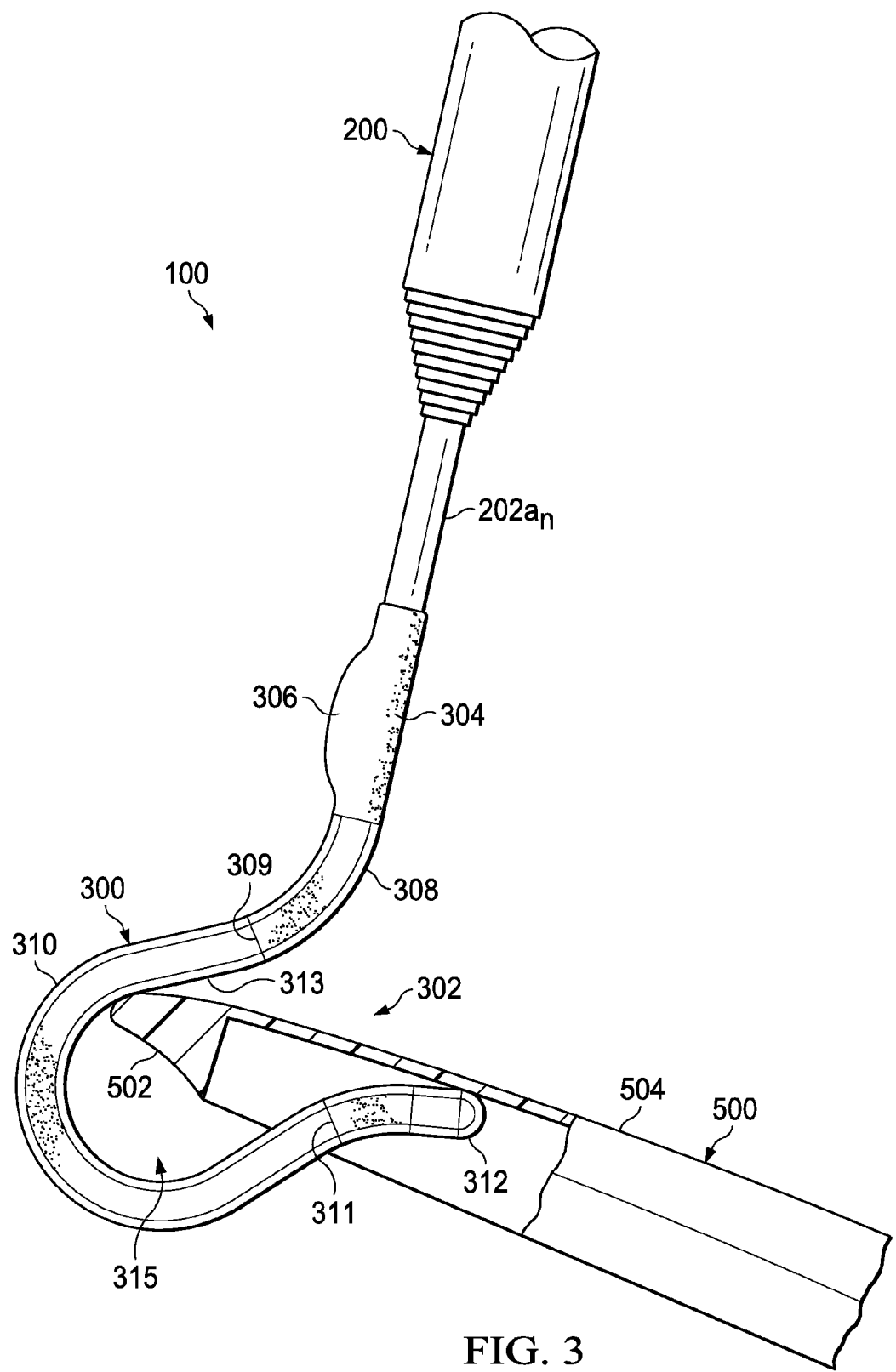
FIG. 3 is a close-up orthogonal side view of the portion of the disc retriever of FIGS. 1 and 2 interfaced with a first type of disc golf disc according to an embodiment of the disclosure.

Referring now to FIG. 3, a close-up orthogonal side view of the portion of the disc retriever 100 of FIGS. 1 and 2 interfaced with a first type of disc golf disc 500 is shown according to an embodiment of the disclosure. The disc retriever 100 is shown with the pole 200 in at least a partially extended position for retrieving the disc golf disc 500. The disc golf disc 500 is shown with a partial cross section and comprises a rim 502 and a flight plate 504. Disc 500 may generally be referred to as a disc golf driver. Disc golf drivers may include distance drivers and fairway drivers. Disc golf drivers may comprise a rim 502 width of about 1.6 to 2.5 centimeters (0.63 to 0.83 inches), a diameter of about 21.1 centimeters (8.31 inches), a rim 502 depth of about 1.0 to 1.2 centimeters (0.39 to 0.47 inches), and a rim 502 height (overall height) of about 1.5 to 1.7 centimeters (0.59 to 0.67 inches). However, the disc retriever 100 is not limited to retrieving disc golf drivers, such as disc golf disc 500, with only these dimensions.

The design of the hook 300 allows gravity to secure the disc 500 within the opening 302 and/or lock onto the rim 502 and the flight plate 504 of the disc 500 to allow an efficient and effective retrieval of the disc 500. In operation, the hook 300 is designed to extend over a far side of the disc 500, receive the disc 500 into the opening 302, and secure and/or lock onto the disc 500 by simply raising, pulling, and/or otherwise manipulating the pole 200 to retrieve the disc 500 from an unreachable area. More specifically, when the disc 500 is oriented with a top side of the flight plate 504 of the disc 500 facing upwards, the pole 200 may be extended across the flight plate 504 of the disc 500, and the extended tab 312 of the hook 300 may be placed and/or manipulated under the rim 502 of the disc 500. The pole 200 may be further pulled and/or manipulated to cause the rim 502 of the disc 500 to be received into the opening 302 of the hook 300. Additionally, in some embodiments, the rim 502 of the disc 500 may be at least partially received within the cavity 315 of the hook 300.

After receiving the rim 502 of the disc 500 into the opening 302 of the hook 300, the pole 200 may be raised, pulled, and/or otherwise manipulated to secure and/or lock the disc 500 within the opening 302 of the hook 300. The disc 500 may be said to be secured and/or locked into the hook 302 when at least a portion of the rim 502 and/or edge of the flight plate 504 contacts the landing zone 313 and when at least a portion of an underside of the flight plate 504 contacts the extended tab 312. As such, the disc 500 may be secured, retained, and/or locked into the hook 302 by at least one of gravity, pressure, and/or friction while the pole 200 is pulled and/or manipulated by a user to retrieve the disc 500 from an unreachable area. More specifically, the configuration of the hook 300 and/or the relationship between the landing zone 313 and the extended tab 312 may secure, retain, and/or lock the disc 500 into the opening 302 of the hook 300 through gravity when the pole 200 is raised and/or otherwise manipulated to bring the disc 500 into the air. Similarly, the hook 300 may secure, retain, and/or lock the disc 500 into the opening 302 of the hook 300 through pressure applied to the flight plate 504 of the disc 500 when the pole 200 is raised and/or otherwise manipulated to bring a disc 500 submerged in a water hazard towards the surface of the water. Still further, the hook 300 may secure, retain, and/or lock the disc 500 into the opening 302 of the hook 300 through friction as result of coefficient of friction between rubberized coating on the hook 300 and the disc 500.

As described herein, the preferable retrieval method for a disc golf driver, such as disc 500, is for the top side of the flight plate 504 of the disc 500 to be facing upwards. This is due at least partially to the shorter rim 502 height and the thicker rim 502 width as compared to other disc golf discs. However, it will be appreciated that the disc retriever 100 may also retrieve disc golf drivers, such as disc 500, when the top side of the flight plate 504 of the disc 500 is facing downwards. Alternatively, the extended tab 312 may be used to flip a disc 500 over when the top side of the flight plate 504 of the disc 500 is facing downwards to orient the disc 500 to the preferable retrieval orientation of the top side of the flight plate 504 of the disc 500 facing upwards. In some embodiments, retrieving a disc 500 with the top side of the flight plate 504 of the disc 500 facing upwards may require the pole 200 to be oriented at an angle of about 30 degrees to about 90 degrees with respect to a horizontal position, and/or about 60 degrees to about 0 degrees with respect to a vertical position. However, once the disc 500 is received within the opening 302 of the hook 300, the hook 300 may be configured to secure, retain, and/or lock the disc 500 in the hook 300 when the pole 200 is traversed between 0 degrees and 90 degrees with respect to a vertical position.

Figure 4:
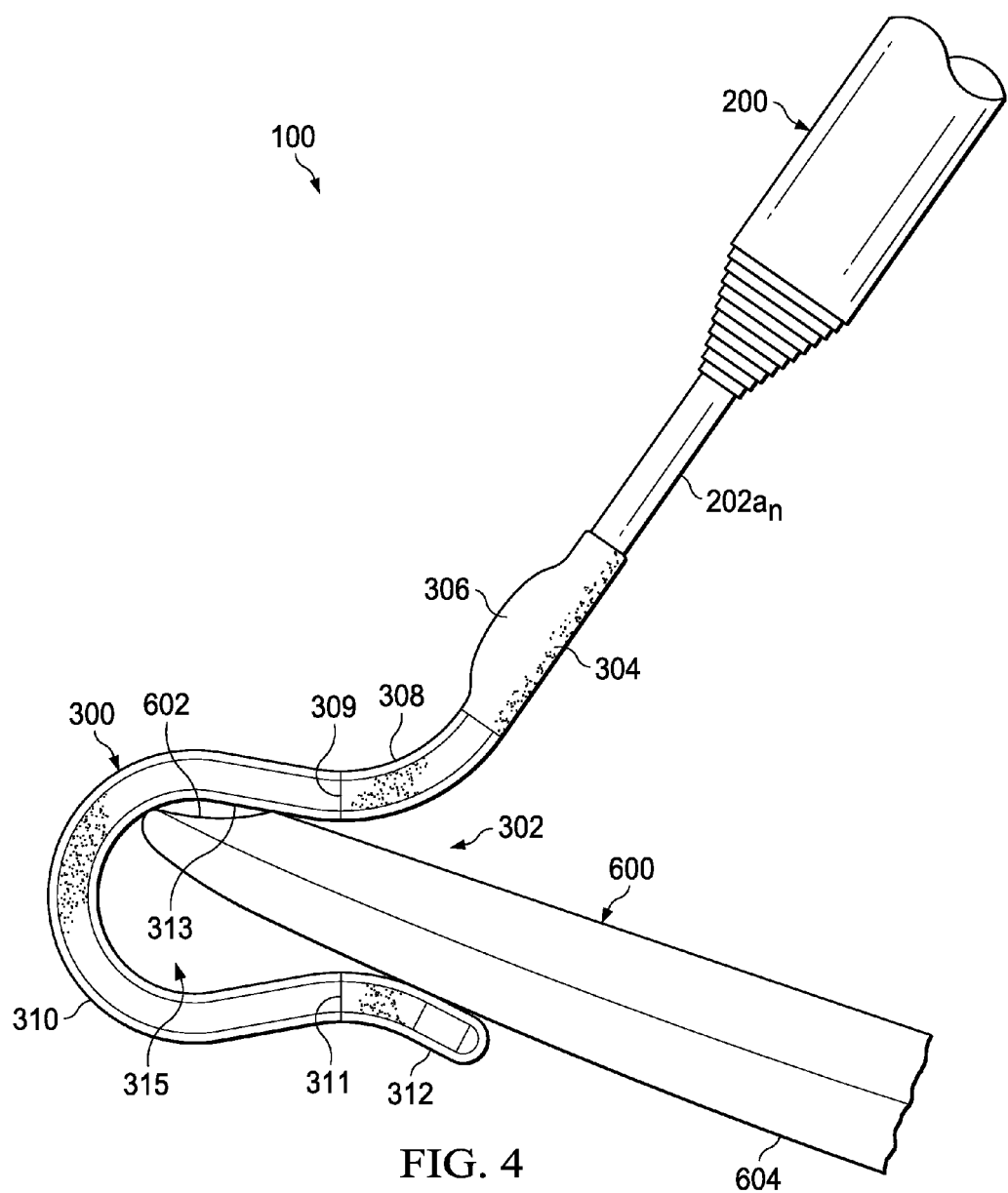
FIG. 4 is a close-up orthogonal side view of the portion of the disc retriever of FIGS. 1 and 2 interfaced with a second type of disc golf disc according to an embodiment of the disclosure.

Referring now to FIG. 4, a close-up orthogonal side view of the portion of the disc retriever 100 of FIGS. 1 and 2 interfaced with a second type of disc golf disc 600 is shown according to an embodiment of the disclosure. The disc retriever 100 is shown with the pole 200 in at least a partially extended position for retrieving the disc golf disc 600. The disc golf disc 600 shown comprises a rim 602 and a flight plate 604 and may generally referred to as a disc golf midrange. However, the techniques disclosed herein with respect to retrieving a disc golf midrange may also be applicable to disc golf putt and approach discs. Disc golf midranges may comprise a rim 602 width of about 1.2 to 1.5 centimeters (0.47 to 0.67 inches), a diameter of about 21.1 to 21.7 centimeters (8.31 to 8.54 inches), a rim 602 depth of about 1.3 centimeters (0.51 inches), and a rim 602 height (overall height) of about 1.9 centimeters (0.75 inches). Disc golf putt and approach discs may comprise a rim 602 width of about 0.7 to 1.0 centimeters (0.28 to 0.39 inches), a diameter of about 21.2 centimeters (8.35 inches), a rim 602 depth of about 1.5 centimeters (0.59 inches), and a rim 602 height (overall height) of about 2.1 centimeters (0.83 inches). However, the disc retriever 100 is not limited to retrieving disc golf midranges and putt and approach discs, such as disc golf disc 600, with only these dimensions.

Figure 5:
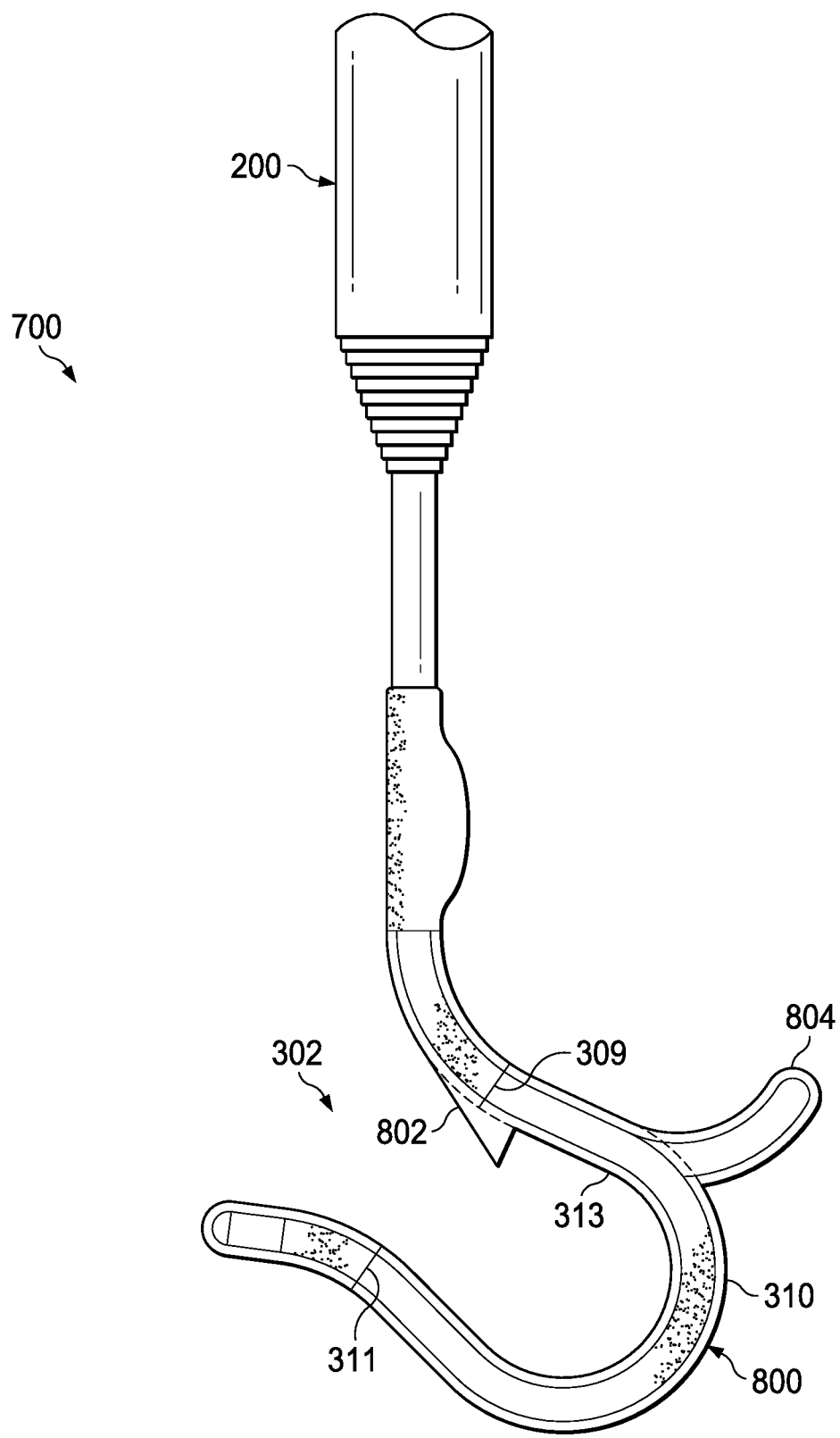
FIG. 5 is an orthogonal side view of a portion of a disc retriever according to another embodiment of the disclosure.

Similarly to retrieving a disc 500 of FIG. 5, the design of the hook 300 also allows gravity to secure the disc 600 within the opening 302 and/or lock onto the rim 602 and the flight plate 604 of the disc 600 to allow an efficient and effective retrieval of the disc 600. In operation, the hook 300 is designed to extend over a far side of the disc 600, receive the disc 600 into the opening 302, and secure and/or lock onto the disc 600 by simply raising, pulling, and/or otherwise manipulating the pole 200 to retrieve the disc 600 from an unreachable area. More specifically, when the disc 600 is oriented with the flight plate 604 of the disc 600 facing downwards, the pole 200 may be extended across an underside of the flight plate 604 of the disc 600, and the extended tab 312 of the hook 300 may be placed and/or manipulated under a top side of the flight plate 604 of the disc 600. The pole 200 may be further pulled and/or manipulated to cause the rim 602 of the disc 600 to be received into the opening 302 of the hook 300. Additionally, in some embodiments, the rim 602 of the disc 600 may be at least partially received within the cavity 315 of the hook 300.

After receiving the rim 602 of the disc 600 into the opening 302 of the hook 300, the pole 200 may be raised, pulled, and/or otherwise manipulated to secure and/or lock the disc 600 within the opening of the hook 300. The disc 600 may be said to be secured and/or locked into the hook 300 when at least a portion of the rim 602 and/or edge of the flight plate 604 contacts the landing zone 313 and when at least a portion of the top side of the flight plate 604 contacts the extended tab 312. As such, the disc 600 may be secured, retained, and/or locked into the hook 302 by at least one of gravity, pressure, and/or friction while the pole 200 is pulled and/or manipulated by a user to retrieve the disc 600 from an unreachable area. More specifically, the configuration of the hook 300 and/or the relationship between the landing zone 313 and the extended tab 312 may secure, retain, and/or lock the disc 600 into the opening 302 of the hook 300 through gravity when the pole 200 is raised and/or otherwise manipulated to bring the disc 600 into the air. Similarly, the hook 300 may secure, retain, and/or lock the disc 600 into the opening 302 of the hook 300 through pressure applied to the underside of the flight plate 604 of the disc 600 when the pole 200 is raised and/or otherwise manipulated to bring a disc 600 submerged in a water hazard towards the surface of the water. Still further, the hook 300 may secure, retain, and/or lock the disc 600 into the opening 302 of the hook 300 through friction as result of coefficient of friction between rubberized coating on the hook 300 and the disc 600.

As described herein, the preferable retrieval method for a disc golf midrange and/or putt and approach disc, such as disc 600, is for the top side of the flight plate 604 of the disc 500 facing downwards. This is due at least partially to the taller rim 602 height and the thinner rim 602 width as compared to other disc golf discs. However, it will be appreciated that the disc retriever 100 may also retrieve disc golf midranges and putt and approach discs, such as disc 600, when the top side of the flight plate 604 of the disc 600 is facing downwards. Alternatively, the extended tab 312 may be used to flip a disc 600 over when the top side of the flight plate 604 of the disc 600 is facing upwards to orient the disc 600 to the preferred retrieval orientation of the underside of the flight plate 604 of the disc 600 facing upwards. In some embodiments, retrieving a disc 600 with the underside of the flight plate 604 of the disc 600 facing upwards may require the pole 200 to be oriented at an angle of about 45 degrees to about 90 degrees with respect to a horizontal position, and/or about 45 degrees to about 0 degrees with respect to a vertical position. However, once the disc 600 is received within the opening 302 of the hook 300, the hook 300 may be configured to secure, retain, and/or lock the disc 600 in the hook 300 when the pole 200 is traversed between 0 degrees and 90 degrees with respect to a vertical position.

Referring now to FIGS. 3 and 4, the disc retriever 100 is configured to retrieve various disc golf discs 500, 600, such as disc golf drivers, midranges, and putt and approach discs, from an unreachable area. Because disc golf discs 500, 600 comprise a wide variety of dimensions, the opening width 314 of the opening 302 must be configured to receive the various disc golf discs 500, 600 so that the various discs may interface with the landing zone 313 and the extended tab 312 to selectively retain the discs 500, 600 in the opening 302 of the hook 300. In some embodiments, the opening width 314 of the opening 302 may comprise at least about 0.80 inches. However, in other embodiments, the opening width 314 of the opening 302 may comprise at least about 0.75 inches to about 0.85 inches, at least about 0.75 inches to about 0.9 inches, or at least about 0.8 inches to about 0.9 inches. Accordingly, the opening width 314 of the opening 302, the relation between the landing zone 313 and the extended tab 312, and the gradually increasing receiving portion formed between the first radial bend 308 and the extended tab 312 collectively allow the hook 300 to interface with various discs 500, 600 and efficiently and effectively retrieve a wide variety of disc golf discs 500, 600 from an unreachable area. Further, it will be appreciated that a disc 500, 600 may also be selectively released from the opening 302 of the hook 300 by adjusting an angle at which the extendable pole is oriented to disperse the disc 500, 600 from the opening 302 of the hook 300.

Referring now to FIG. 5, an orthogonal side view of a portion of a disc retriever 700 is shown according to another embodiment of the disclosure. The disc retriever 700 may be substantially similar to the disc retriever 100 of FIGS. 1-4. However, disc retriever 700 comprises hook 800. Disc retriever 700 may be substantially similar to the disc retriever 100, and hook 800 may be substantially similar to the hook 300 of FIGS. 1-4. However, hook 800 may also comprise at least one nipple 802 and/or a back hook 804. The nipple 802 may be configured to further secure, retain, and/or lock a disc 500, 600 into the opening 302 of the hook 800 by providing a retaining feature that interfaces with at least one of the rim 502, 602 and/or the flight plate 504, 604 of a disc 500, 600 retained within the opening 302 of the hook 800. In some embodiments, the nipple 802 may comprise a single bump, a plurality of bumps, a ridge that extends across the width of the hook 800, and/or any other feature that extends from the landing zone 313 of the hook 800 to further secure, retain, and/or lock a disc 500, 600 into the opening 302 of the hook 800. Additionally, the disc retriever 700 may further comprise a back hook 804 that extends from an outer surface of the second radial bend 310. In some embodiments, the back hook 804 may comprise a rounded tab that extends from the second radial bend 310 tangentially in an opposing radial direction with respect to second radial bend 310. However, in alternative embodiments, the back hook 804 may comprise a straight tab that extends tangentially from the second radial bend 310. In yet other embodiments, the back hook 804 may comprise a straight tab that extends at an angle with respect to the second radial bend 310. The back hook 804 may be configured to work with a conventional raking motion of the pole 200 to quickly retrieve a disc 500, 600 from an unreachable area by interfacing the back hook 804 with at least one of the rim 502, 602 and the flight plate 504, 604 of a disc 500, 600. Alternatively, the back hook 804 may be configured to allow a user to flip over a disc 500, 600 to orient the disc 500, 600 in the preferred retrieval orientation, depending on the type of disc 500, 600, and in accordance with embodiments and methods described herein.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A disc retriever, comprising:
    a rigid hook comprising:
        a series of radial bends that form a cavity and an opening, the cavity comprising a substantially flat landing zone, and the opening comprising a smaller width than the cavity; and
        an extended tab extending from an end of the radial bend that forms the cavity at least partially in a substantially straight direction;
    wherein the rigid hook is configured to selectively retain a disc within the opening of the rigid hook (1) when at least a portion of a rim of the disc is received within the cavity of the rigid hook, at least one of a portion of a rim of the disc and an edge of a flight plate of the disc contacts the substantially flat landing zone, and at least a portion of a flight plate of the disc contacts the extended tab, and (2) when a flight plate of the disc is oriented in each of upwards and downwards direction.

2. The disc retriever of claim 1, wherein a width of the opening comprises at least about 0.80 inches.

3. The disc retriever of claim 1, wherein the rigid hook comprises a rubberized coating that increases a coefficient of friction with the disc as compared to a non-coated rigid hook.

4. The disc retriever of claim 1, wherein the rigid hook comprises a first radial bend, the second radial bend comprising the substantially flat landing zone that extends from the first radial bend.

5. The disc retriever of claim 4, wherein the rigid hook comprises at least one nipple that extends from the substantially flat landing zone.

6. The disc retriever of claim 4, wherein the rigid hook comprises a back hook that extends from an outer surface of the second radial bend.

7. The disc retriever of claim 4, wherein at least a portion of a top side of the flight plate contacts the extended tab when the flight plate of the disc is oriented in the downwards direction, and wherein at least a portion of an underside of the flight plate contacts the extended tab when the flight plate of the disc is oriented in the upwards direction.

8. The disc retriever of claim 4, wherein the disc is retained in the rigid hook by at least one of gravity and friction.

9. The disc retriever of claim 1, wherein the rigid hook is selectively attachable to a pole.

10. The disc retriever of claim 1, further comprising:
a second rigid hook wherein the rigid hook and the second rigid hook are arranged in a Y-shaped arrangement.

11. A disc retriever, comprising:
an extendable pole; and
a rigid hook coupled to the extendable pole and comprising:
a series of radial bends that form a cavity and an opening, the cavity comprising a substantially flat landing zone, and the opening comprising a smaller width than the cavity; and
an extended tab extending from an end of the radial bend that forms the cavity at least partially in a substantially straight direction;
wherein the rigid hook is configured to selectively retain a disc within the opening of the rigid hook (1) when at least a portion of a rim of the disc is received within the cavity of the rigid hook, at least one of a portion of a rim of the disc and an edge of a flight plate of the disc contacts the substantially flat landing zone, and at least a portion of a flight plate of the disc contacts the extended tab, and (2) when a flight plate of the disc is oriented in each of upwards and downwards direction.

12. The disc retriever of claim 11, wherein the rigid hook comprises a rubberized coating that increases a coefficient of friction with the disc as compared to a non-coated rigid hook.

13. The disc retriever of claim 11, wherein the rigid hook is further configured to selectively retain the disc while the extendable pole is manipulated to bring the disc into the air.

14. The disc retriever of claim 13, wherein the rigid hook is further configured to selectively retain the disc when the extendable pole is manipulated to bring the disc towards a surface of a body of water when the disc is submerged in the body of water.

15. The disc retriever of claim 13, wherein the disc is retained in the rigid hook by at least one of gravity and friction when the extendable pole is manipulated to bring the disc into the air.

16. The disc retriever of claim 11, wherein the rigid hook comprises at least one nipple that extends from the substantially flat landing zone.

17. The disc retriever of claim 11, wherein the rigid hook comprises a back hook that extends from an outer surface of the second radial bend.

18. The disc retriever of claim 11, wherein the extendable pole comprises a plurality of concentric, coaxial pole sections that are each extendable to a plurality of positions with respect to a maximum extendable length.

19. A method of retrieving a disc, comprising:
providing a disc retriever with an extendable pole and a rigid hook coupled to the extendable pole, the rigid hook comprising: a series of radial bends that form a cavity and an opening, the cavity comprising a substantially flat landing zone, and the opening comprising a smaller width than the cavity; and an extended tab extending from an end of the radial bend that forms the cavity at least partially in a substantially straight direction;
extending the extendable pole over a far side of a disc;
receiving the disc at least partially into the opening of the rigid hook; and
retaining the disc within the opening of the rigid hook by at least one of gravity and friction when at least a portion of a rim of the disc is received within the cavity of the rigid hook, at least one of a portion of a rim of the disc and an edge of a flight plate of the disc contacts the substantially flat landing zone, and at least a portion of a flight plate of the disc contacts the extended tab when at least one of raising and pulling the extendable pole to bring the disc into the air.

20. The method of claim 19, further comprising:
selectively releasing the disc from the opening of the rigid hook by adjusting an angle at which the extendable pole is oriented.

* * * * *